United States Patent [19]
Akatsu et al.

[11] Patent Number: 5,995,130
[45] Date of Patent: Nov. 30, 1999

[54] LASER BEAM SCANNING APPARATUS AND METHOD PROVIDING CONTROLLABLE PRINT DENSITY

[75] Inventors: Kazuhiro Akatsu, Hitachinaka; Susumu Saito, Hachiouji; Keiji Kataoka, Hitachinaka; Shuho Yokokawa, Mito; Koji Doi; Masahiro Mizuno, both of Hitachinaka, all of Japan

[73] Assignee: Hitachi Koki Co., Ltd., Tokyo, Japan

[21] Appl. No.: 08/685,560

[22] Filed: Jul. 24, 1996

[30] Foreign Application Priority Data

Aug. 11, 1995 [JP] Japan ..................................... 7-205850
Apr. 10, 1996 [JP] Japan ..................................... 8-088021

[51] Int. Cl.$^6$ ........................................................ B41J 2/47
[52] U.S. Cl. ........................ 347/254; 347/239; 347/240; 347/256; 347/241; 359/210; 353/101
[58] Field of Search ................................... 347/239, 240, 347/254, 256, 258, 241; 359/210, 672, 673, 674, 675; 353/102, 101

[56] References Cited

U.S. PATENT DOCUMENTS 4,871,238 10/1989 Sato et al. ................................ 395/675
5,475,416 12/1995 Kessler et al. ......................... 347/241 X

FOREIGN PATENT DOCUMENTS

| | | | |
|---|---|---|---|
| 58-200207 | 11/1983 | Japan | ..................................... 359/674 |
| 60-169820 | 9/1985 | Japan . | |
| 4-194813 | 7/1992 | Japan | ............................. G02B 26/10 |
| 6-11657 | 1/1994 | Japan . | |
| 7-205850 | 8/1995 | Japan . | |
| 8-88021 | 4/1996 | Japan . | |

*Primary Examiner*—N. Le
*Assistant Examiner*—Hai C. Pham
*Attorney, Agent, or Firm*—Antonelli, Terry, Stout & Kraus, LLP

[57] ABSTRACT

A laser beam scanning apparatus and method for providing controllable print density. The laser beam scanning apparatus includes a modulator for modulating a light beam, a rotating polygon mirror for deflectively scanning a light beam which is passed through the modulator, at least one lens unit having at least one lens which is movable to a position on the optical axis and a position completely off the optical axis, and a controller for switching the modulating clock frequency of the modulator and the rotating speed of the polygon mirror together with selective shifting of the at least one lens unit or lens thereof to a position on the optical axis or completely off the optical axis whereby the method effects control of the apparatus for controlling print density.

4 Claims, 10 Drawing Sheets

LASER BEAM SCANNING APPARATUS AND METHOD PROVIDING CONTROLLABLE PRINT DENSITY

BACKGROUND OF THE INVENTION

The present invention relates to a laser beam scanning apparatus of the type used in apparatus such as a laser printer and a copier; and, more particularly, the invention relates to an electro-photographic apparatus having the capability of switching its resolution (print dot density).

An electro-photographic apparatus having a capability of having its resolution (print dot density) switched is disclosed in, for example, Japanese Patent Application Laid-Open No. 60-169820, Japanese Patent Application Laid-Open No. 6-11657, USP 5,006,705.

Japanese Patent Application Laid-Open No. 60-169820 discloses a technology where the beam pitch of a plurality of light beams and the diameter of the light beams are adjusted by adjusting a zoom lens provided in an optical system to form an image having a desired resolution.

Japanese Patent Application Laid-Open No. 6-11657 discloses a technology where an image forming position is adjusted or the pitch of light beams emitted from a plurality of light sources is varied by moving a lens in the direction of the optical axis.

U.S. Pat. No. 5,006,705 discloses a technology where the pitch between two light beams is varied depending on a desired dot density.

The above conventional technologies have the following disadvantages.

First of all, the constructions are complex since a zoom lens is required for adjusting the beam pitch and the light beam diameter in the case of Japanese Patent Application Laid-Open No. 60-169820, and a lens moving mechanism is required for moving the lens in the direction of the optical axis in the case of Japanese Patent Application Laid-Open No. 6-11657. Further, in the case of U.S. Pat. No. 5,006,705, there is a limitation to the changeable range of the dot density, because the light beam spot diameter is constant, and therefore the construction is not suitable for effecting a change in a wide range of print dot densities.

SUMMARY OF THE INVENTION

An object of the present invention is to provide a laser beam scanning apparatus and method in which the print dot density can be switched using a simple construction.

Another object of the present invention is to provide a laser beam scanning apparatus and method in which the spot diameter and the beam pitch can be accurately switched even when a plurality of light beams are used.

The objects of the present invention can be attained by providing a laser beam scanning apparatus which comprises a modulator for modulating a light beam; a rotating polygon mirror for deflectively scanning a light beam which has passed through the modulator; a lens unit for supporting lenses with respect to an optical axis so that the lenses are movable back-and-forth to and from the optical axis; and control means for switching the modulating clock frequency of the modulator and the rotating speed of said polygon mirror together with switching the lenses to and from the optical axis, and a method for controlling the print density.

Detailed Description of the Preferred Embodiments

Figure 2:
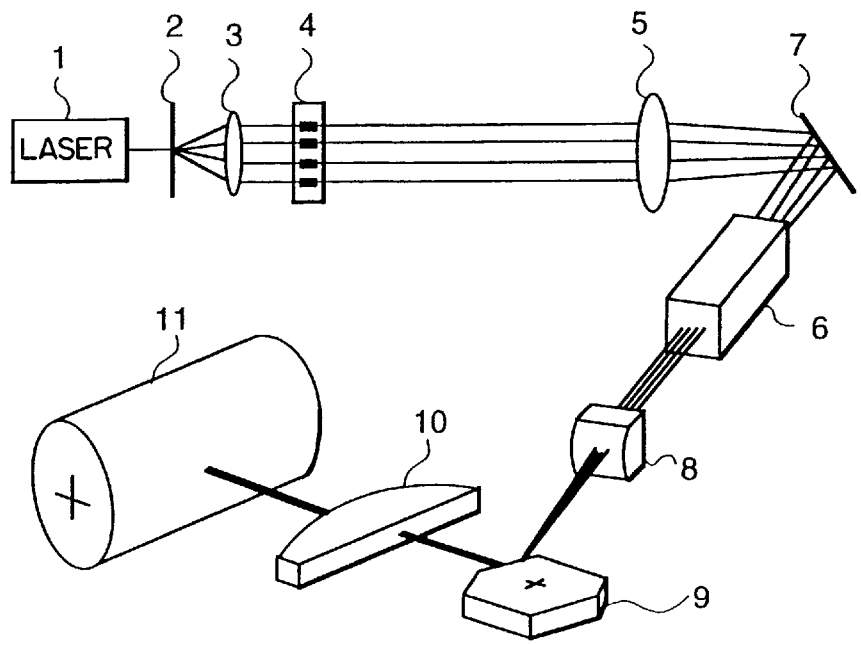
FIG. 2 is a schematic diagram for explaining the principle of the present invention.

Initially, the principle of the present invention will be described below, referring to FIG. 2. FIG. 2 shows a laser beam scanning apparatus using four light beams, as an example, although the number of light beams used may be less or more than four.

A light beam generated by a light source 1, such as a laser, is split into four light beams by a multi-beam generating element 2, such as a diffraction grating, and then the four light beams are introduced into a modulator 4, having modulating elements corresponding to each of the light beams, through a condenser lens 3.

The light beams modulated and output from the modulator 4 are formed into parallel light beams by an optical system 5, and then the beams, after being reflected by a mirror 7, are rotated by a given amount by a rotation element 6, such as a Daubresse prism, so that the four light beams will have a proper beam spacing on a photosensitive body.

After that, the light beams are passed through a cylindrical lens 8 and are respectively converged only in a sub-scanning direction on a rotating polygon mirror 9; the converged light beams are deflectively scanned by the rotating polygon mirror 9; and then the scanned light beams are caused to form an image on the photosensitive body 11 by way of an FΘ lens 10.

Figure 3:
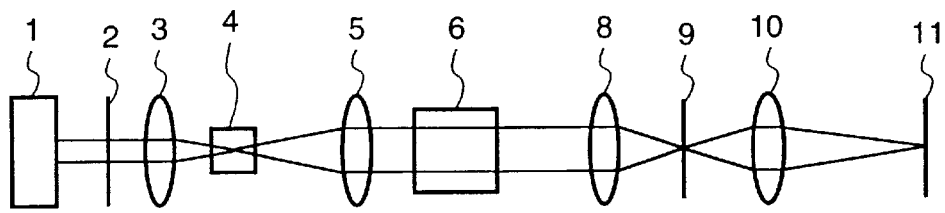
FIG. 3 is a diagrammatic side view of the elements along a light path for explaining the principle of the present invention.
Figure 4:
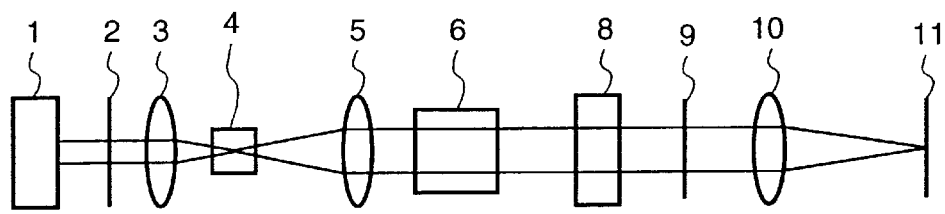
FIG. 4 is a diagrammatic plan view of the elements along a light path for explaining the principle of the present invention.

The four light beams are diagonally arrayed with respect to the scanning direction and are scanned together on the photosensitive body. Here, calculation will be performed on the spot diameter and the pitch of the light beam on the photosensitive body 11 when the focal length of the optical system 5 is changed. FIG. 3 is a diagrammatic side view of one light beam path among the four light beams in FIG. 2. FIG. 4 is a diagrammatic plan view of the one light beam path.

Initially, the spot diameter will be calculated. The spot diameter at the position of the modulator 4 is assumed to be $\alpha$ in the sub-scanning direction and $\beta$ in the scanning direction. It is assumed that the optical system 5, the cylindrical lens 8 and the FΘ lens 10 are set so that the spot diameter in the sub-scanning direction on the photosensitive body 11 becomes $\alpha$, that is, the magnification is 1 (one). Further, it is assumed that the focal length of the optical system 5 and the focal length of the FΘ lens 10 on the photosensitive body 11 are determined so that the spot diameter in the scanning direction becomes $\beta$.

Here, let the focal length of the optical system 5 be g and the ratio to convert the print dot density be h. When the focal length of the optical system 5 is changed to g×h, the spot diameter in the sub-scanning direction becomes $\alpha/h$ and the spot diameter in the scanning direction becomes $\beta/h$.

Figure 5:
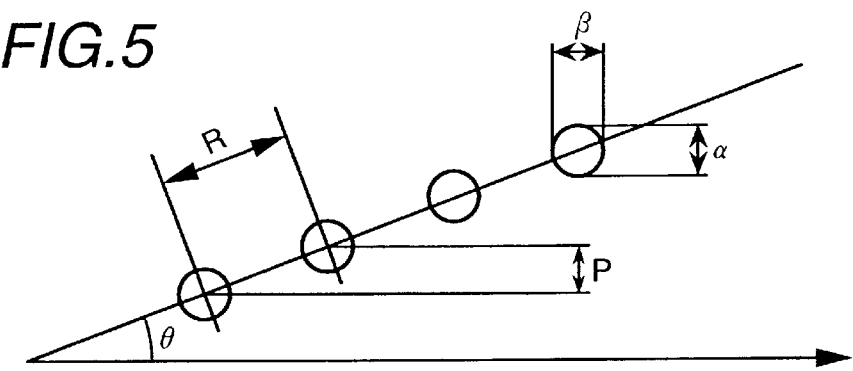
FIG. 5 is a diagram for explaining the characteristics of a beam spot array.
Figure 6:
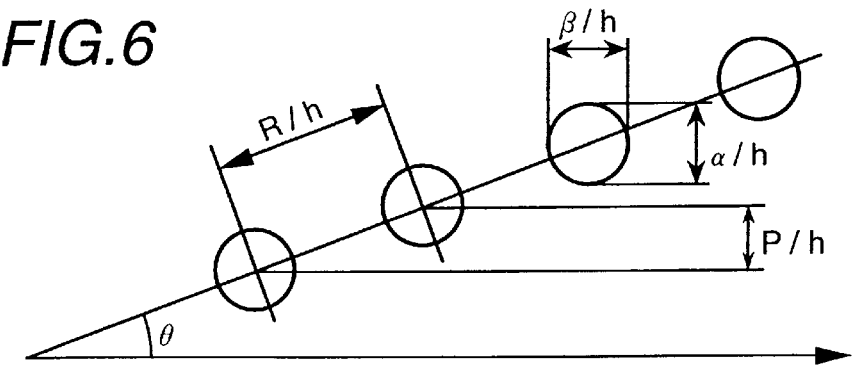
FIG. 6 is a diagram for explaining the characteristics of a beam spot array when the focal length is changed.

Next, the beam pitch will be calculated. Let the beam pitch at the location of the modulator 4 be R. When the magnification is assumed to be 1 (one) as in the above calculation of the spot diameter, the pitch on the photosensitive body 11 also becomes R. This feature is shown in FIG. 5. FIG. 5 shows the spots produced when a plurality of light beams are diagonally arrayed at an angle Θ to the scanning direction and are scanned together. Here, when the focal length of the optical system is changed from g to g×h, the light beam pitch on the photosensitive body 11 becomes R/h. This feature is shown in FIG. 6.

The above description can be summarized as follows. FIG. 5 shows the feature of the spots in which the pitch is set so as to become P corresponding to the print dot density of a scanning pitch P. When the spots are diagonally arrayed by the angle Θ using the rotation elements 6, such as Daubresse prisms, the relation P=R sin Θ is satisfied so that the spots are arrayed with a given pitch P. When the focal length of the optical system is changed from g to g×h, the light beam pitch on the photosensitive body 11 changes as shown in FIG. 6. That is, both the spot diameter and the pitch are magnified by 1/h. At this time, the pitch distance of the scanning lines between the plurality of light beams is also magnified by 1/h even when the angle Θ is not changed.

When the moving speed of the photosensitive body is kept constant and the rotating speed of the polygonal mirror 9 is increased by h, the print dot density can be changed so that the scanning line pitch becomes uniform (h) over the whole print surface. Further, by changing the modulating frequency to $h^2$ times, the print dot density can be changed.

Although, for the purpose of simplified explanation, the above description relates to the case where the spot diameter and the pitch at the location of the modulator are maintained at the same values as those on the photosensitive body 11, that is, in the case of a magnification of 1 (one), the aforementioned relationship can be satisfied even in a case involving a different magnification. Furthermore, it is possible to change various print dot densities by providing the optical system with many variable stages.

Embodiments of the present invention will be described below.

Figure 1:
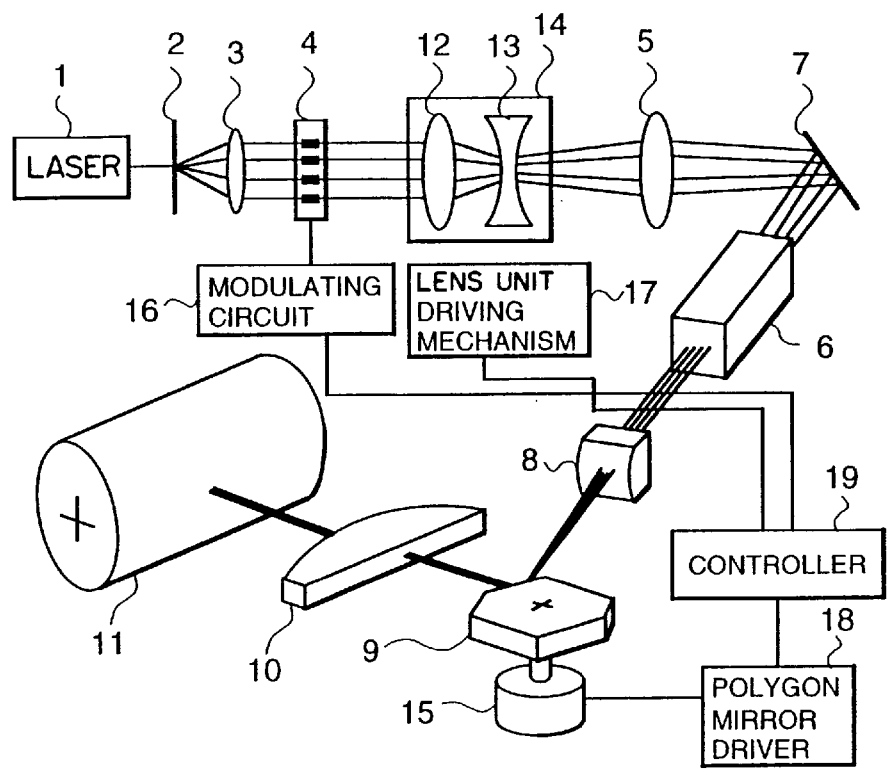
FIG. 1 is a schematic diagram showing the construction of a first embodiment of a laser beam scanning apparatus in accordance with the present invention.

FIG. 1 shows a first embodiment of a laser beam scanning apparatus in accordance with the present invention. The laser beam scanning apparatus of FIG. 1 prints an image using four light beams.

The reference character 1 in FIG. 1 is a light source for generating a light beam, such as a laser. A light beam generated by the light source 1 is split into four light beams by a multi-beam generating element 2, such as a diffraction grating. The plurality of light beams are introduced into a modulator 4, such as an AO converter, through a condenser lens 3. Each of the light beams modulated in the modulator 4 is passed through lenses 12, 13 forming a lens unit 14, a fixed lens 5, a mirror 7, a rotating element 6 composed of Daubresse prisms, and a cylindrical lens 8, and then they are guided onto a rotating polygon mirror 9 in a state of being converged only in a sub-scanning direction. The guided light means are deflectively scanned by the polygon mirror 9, and then the scanned light beams are focussed on the photosensitive body 11 by an FΘ lens 10. The four light beams are diagonally arrayed with respect to the scanning direction and are scanned together on the photosensitive body.

As shown in FIG. 1, the modulator 4 is connected to a modulating circuit 16 which can switch the modulation clock frequency of the modulator 4; the lens unit 14 is connected to a lens unit driving mechanism 17 which moves the whole lens unit 14 back and forth to and from the optical axis; and a driving motor 15 for rotating the polygon mirror 9 is connected to a polygon mirror driver 18, which can switch the rotating speed of the polygon mirror 9. The modulating circuit 16, the lens unit driving mechanism 17 and the polygon mirror driver 18 are controlled by a controller 19 so as to maintain a predetermined relationship corresponding to a selection of the print dot density.

Figure 7:
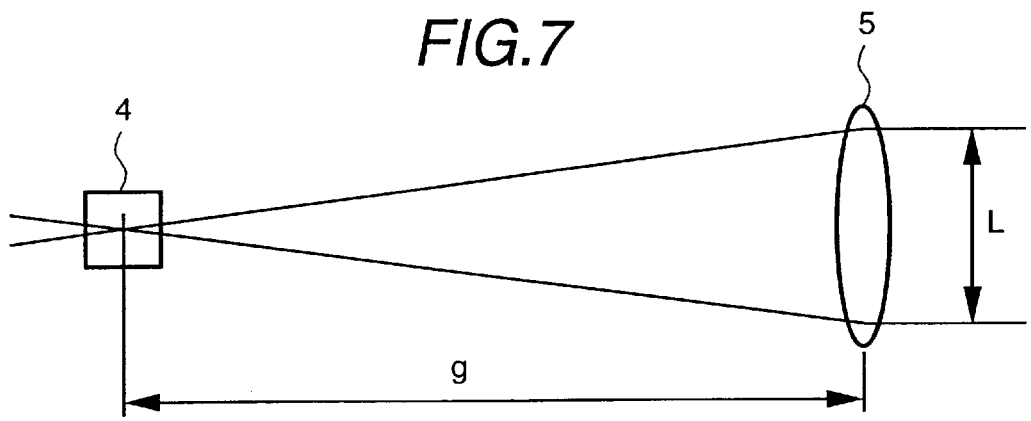
FIG. 7 is a diagram showing a state where a lens unit is moved off of the optical axis in the first embodiment in accordance with the present invention.
Figure 8:
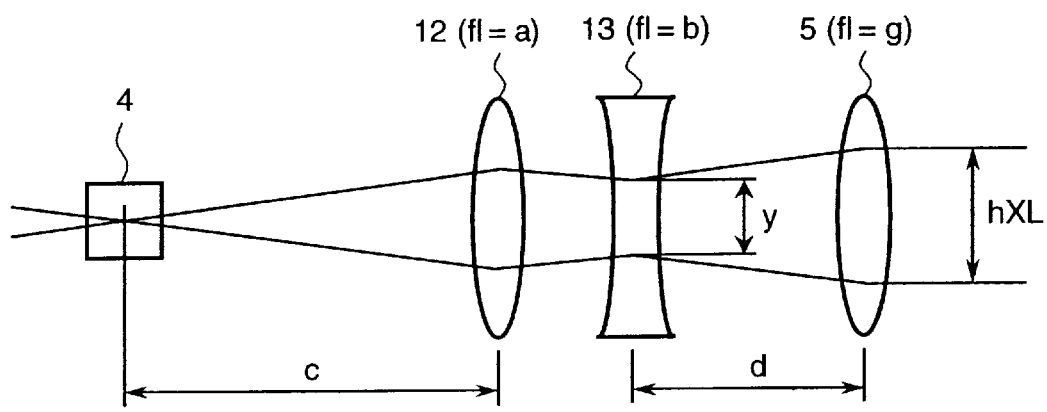
FIG. 8 is a diagram showing a state where a lens unit is set on the optical axis in the first embodiment in accordance with the present invention.

In the construction of FIG. 1, the relationship between a case where the lenses 12, 13 of the lens unit 14 are not set in front of the fixed lens 5, that is, the lens unit 14 is moved off of the optical axis, as seen in FIG. 7, and a case where the lenses 12, 13 are set in front of the fixed lens 5, that is, the lens unit 14 is moved onto the optical axis, as seen in FIG. 8, will be described. FIG. 8 shows a state where the lens 12 having a focal length a and the lens 13 having a focal length b are set between the modulator 4 and the fixed lens 5 having a focal length g in order to change the print dot density from that produced by the arrangement of FIG. 7. The distance indicated in the figure the a distance between positions of the lens main points. Here, a case where the print dot density is changed, for example, from D dots/inch (dpi) to h×D (dpi) will be described. For effecting the change, the optical system is changed by adding the lenses 12, 13 in front of the fixed lens 5 so that the beam width of the light which has passed through the fixed lens 5 becomes h×L.

Let the beam width at the position of the lens 13 be y, as shown in FIG. 8. The value y can be obtained as Equation (1) from h, d and g.

$$y = hL - hLd/g \qquad (1)$$

Figure 9:
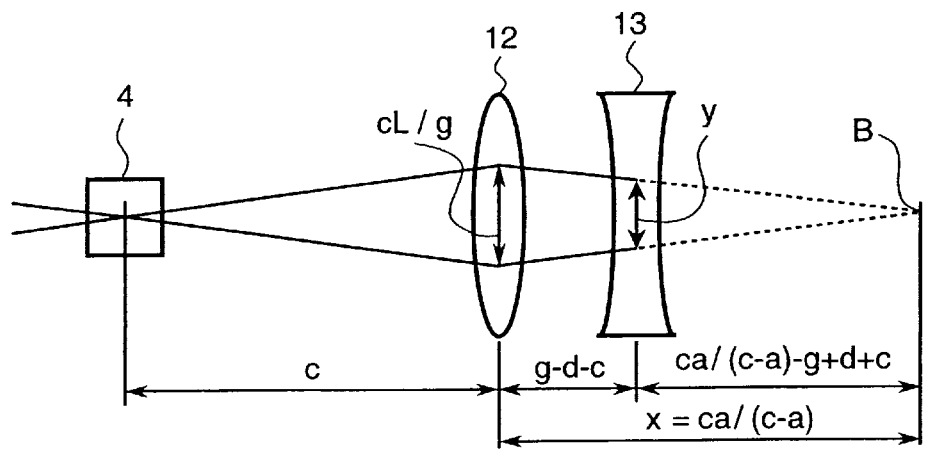
FIG. 9 is a diagram for explaining the lens construction of the first embodiment in accordance with the present invention.

The beam diameter at the position of the lens 12 is obtained as cL/g, as shown in FIG. 9.

Since the focal length of the lens 12 is a and the light at the position of the modulator 4 is focussed on a point B of FIG. 9 by the lens 12, the distance X between the lens 12 and the point B satisfies the relation of Equation (2).

$$a^2 = (c-a)X(x-a) \qquad (2)$$

By re-writing this equation, Equation (3) can be derived.

$$X = ca/(c-a) \qquad (3)$$

From the above results, the arrangement of the optical system can be expressed as shown in FIG. 9.

The value y in FIG. 9 can be expressed as Equation (4) using a, c, g and d.

$$y = L \times (c-a) \times \{ca/(c-a) - g + d + c\}/ag \qquad (4)$$

Since the focal length of the lens 13 is b, Equation (5) can be satisfied.

$$b^2 = (g - d + b) \times \{ca/(c-a) - g + d + c + b\} \qquad (5)$$

From Equation (1) and Equation (4), Equation (6) can be obtained.

$$a = cx(c + d - g)/\{(1-h) \times (d-g)\} \qquad (6)$$

As a result, changing the print dot density can be accomplished by selecting the focal lengths a and b and the lens arranging positions c and d which satisfy Equation (5) and Equation (6) for given values g and h.

In a case where the print dot density is changed, switching the print dot density is accomplished by setting the lens unit 14 to a pre-determined position between the modulator 4 and the fixed lens 5 and by changing the rotating speed of the polygon mirror and the modulating frequency of the modulator corresponding to a signal received from the controller 19 to change the focal length in combination with the fixed lens 5.

Here, switching of the rotating speed of the polygon mirror and the modulating frequency of the modulator will be described.

Letting the print dot density before changing be D1, a print dot density after changing be D2, a change ratio of the print dot density be N, a modulating clock frequency before changing be S1, a modulating clock frequency after changing be S2, a rotating speed of the polygon mirror before changing be M1, and a rotating speed of the polygon mirror after changing be M2, Equation (7), Equation (8) and Equation (9) are satisfied.

$$N = D2/D1 \qquad (7)$$

$$S2 = S1 \times (D2/D1)^2 = S1 \times N^2 \qquad (8)$$

$$M2 = M1 \times (D2/D1) = M1 \times N \qquad (9)$$

Figure 10:
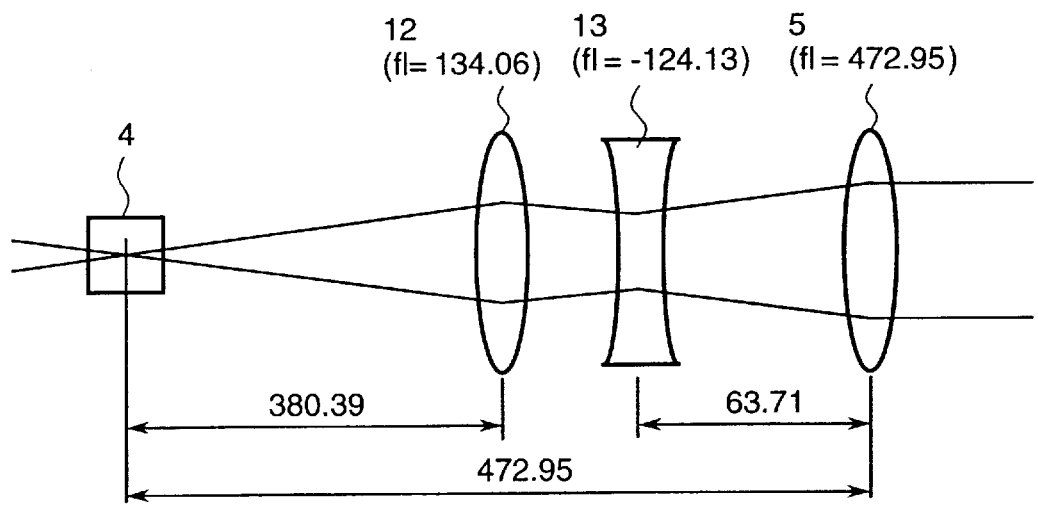
FIG. 10 is a diagram for explaining an example of the parameters of the first embodiment in accordance with the present invention.

Switching of the print dot density in the above construction will be discussed in detail with respect to a numerical example. In a case where the print dot density is switched from 600 dpi to 480 dpi, as shown in FIG. 10, Equation (5) and Equation (6) are satisfied when h=480/600, g=472.95 mm, a=134.06 mm, b=−124.13 mm and d=63.71 mm. The rotating polygon mirror is rotated at 480/600 times, that is, 0.8 time as fast as, the speed in a case of a print dot density of 600 dpi. The optical system in a case where the lenses 12, 13 are not set on the optical axis, as seen in FIG. 7, corresponds to the print dot density 600 dpi, and the optical system in a case where the lenses 12, 13 are set on the optical axis, as seen in FIG. 8, corresponds to the print dot density 480 dpi.

When the rotating speed of the polygon mirror at 600 dpi is assumed to be 19800 rpm, the rotating speed at 480 dpi is 480/600 times that, that is, 15840 rpm. Similarly, when the modulating frequency of the modulator at 600 dpi is 38.6 MHz, the modulating frequency at 480 dpi becomes (480/600)² times that, that is, 24.7 MHz. In FIG. 10, the character f1 indicates focal length.

Figure 11:
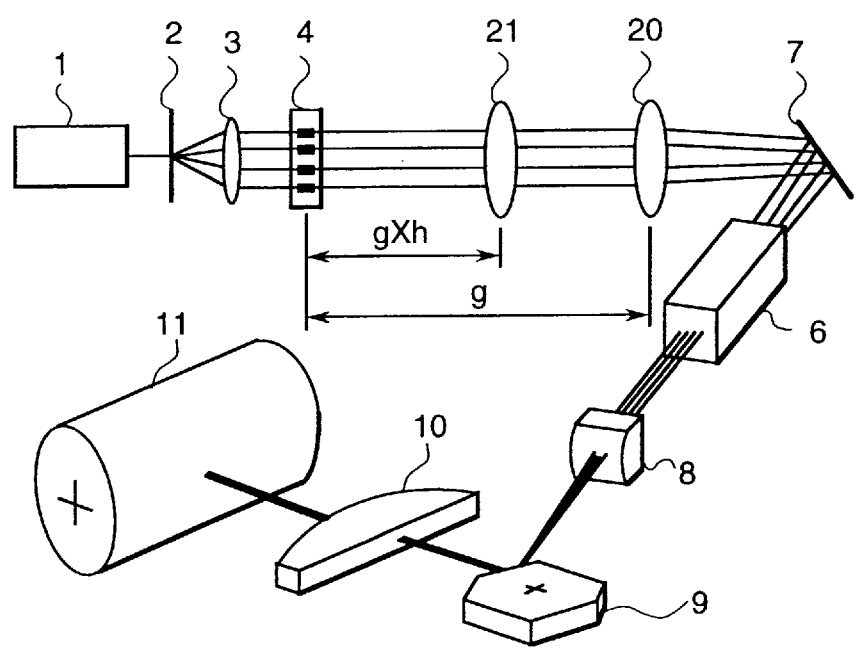
FIG. 11 is a schematic diagram showing the construction of a second embodiment in accordance with the present invention.

A second embodiment of the present invention will be described below, referring to FIG. 11. The focal length of a first lens system 20 is g. The print dot density is switched from D (dpi) to h×D (dpi). The above switching can be performed by moving the first lens system 20 from the optical axis and setting a second lens system 21 having a focal length g×h at a position spaced g×h from the modulator 4.

Discussion will be made of a case where the print dot density is switched from 600 dpi to 480 dpi in the second embodiment. Since h=480/600 and assuming g=472.95 mm, the focal length a of the first lens system 20 becomes 472.95×480/600=378.36 mm. When this lens system is set at a position spaced 378.36 mm from the modulator 4, an optical system for 480 dpi can be obtained.

A third embodiment of the present invention will be described below, referring to FIG. 12. When only the fixed lens 5 is used, the print dot density is D (dpi) as the same as in the first embodiment. When the print dot density is switched to h×D (dpi), a lens 22 is set between the modulator 4 and the fixed lens 5 and a lens 23 is set at a rear position, i.e. on the other side of the fixed lens 5 from the lens 22. Back-and-forth movement of the lenses 22 and 23 to and from the optical axis is performed by driving a single lens unit 24 supporting both lenses 22 and 23. An example of the arrangement of elements and the focal lengths is shown in FIG. 13.

A fourth embodiment of the present invention will be described below, referring to FIG. 14. In this embodiment, the print dot density is changed by back-and-forth movement of the lenses 25 and 26 to and from the optical axis at the rear position of the fixed lens 5. When the lenses 25 and 26 mounted on a lens unit 27 are not set on the optical axis, the print dot density is D (dpi). When the lenses 25 and 26 mounted on the lens unit 27 are set on the optical axis, the print dot density is h×D (dpi).

Figure 15:
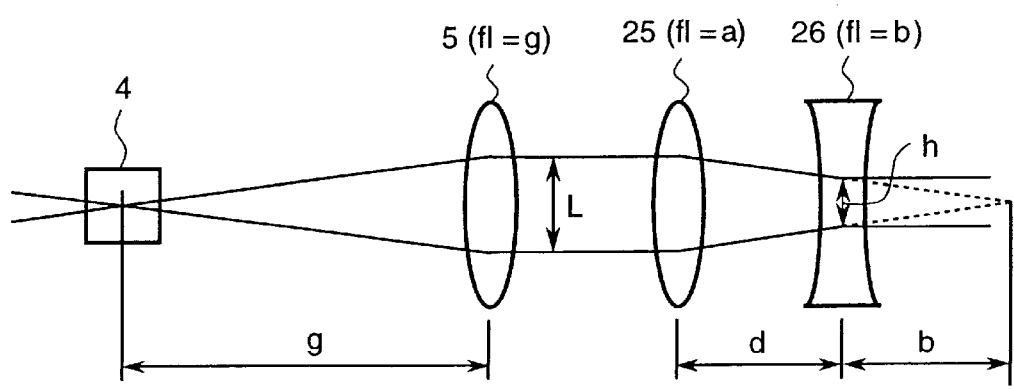
FIG. 15 is a diagram for explaining the lens construction of the parameters of the fourth embodiment in accordance with the present invention.
Figure 16:
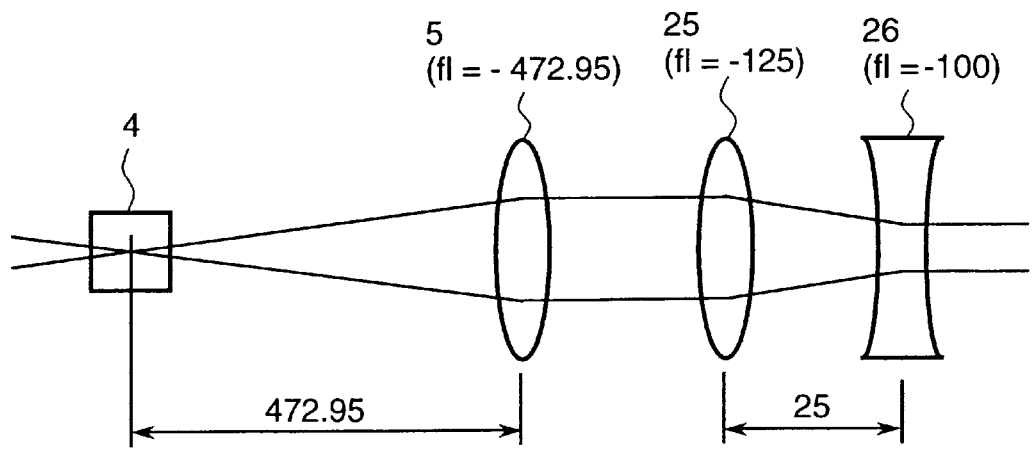
FIG. 16 is a diagram for explaining an example of the parameters of the fourth embodiment in accordance with the present invention.

The arrangement of elements and focal lengths of the lenses 25 and 26 will be described in detail, referring to FIG. 15 and FIG. 16. When the arrangement of elements and the focal lengths are determined as shown in FIG. 15, Equation (10) is satisfied.

$$d = b - bL/h \qquad (10)$$

The focal length a of the lens 25 can be expressed as d−b, and it is necessary to arrange the lenses 25 and 26 so as to satisfy the above relations. A calculation will be made of a case where the focal length of the fixed lens 5 is 472.95 mm and the print dot density is changed from 600 dpi to 480 dpi. In this case, h is 480/600. When the focal length b of the lens 26 is assumed to be −100 mm, d=25 mm from Equation (10). Thus, a=25+100=125 mm.

Although the aforementioned embodiments have been directed to examples wherein the plurality of light beams are scanned in an array of the beams arranged diagonal to the scanning direction on the photosensitive body, the same results can be obtained in a case where the plurality of light beams are scanned in an array of the beams arranged perpendicular to the scanning direction.

A description will be made in detail below of embodiments of the back-and-forth driving mechanism for the lens unit or the lens system as provided in the first embodiment to the fourth embodiment in accordance with the present invention.

For example, the following four types of drive mechanism can be considered for the back-and-forth driving mechanism of the first embodiment, the third embodiment and the fourth embodiment.

Figure 17:
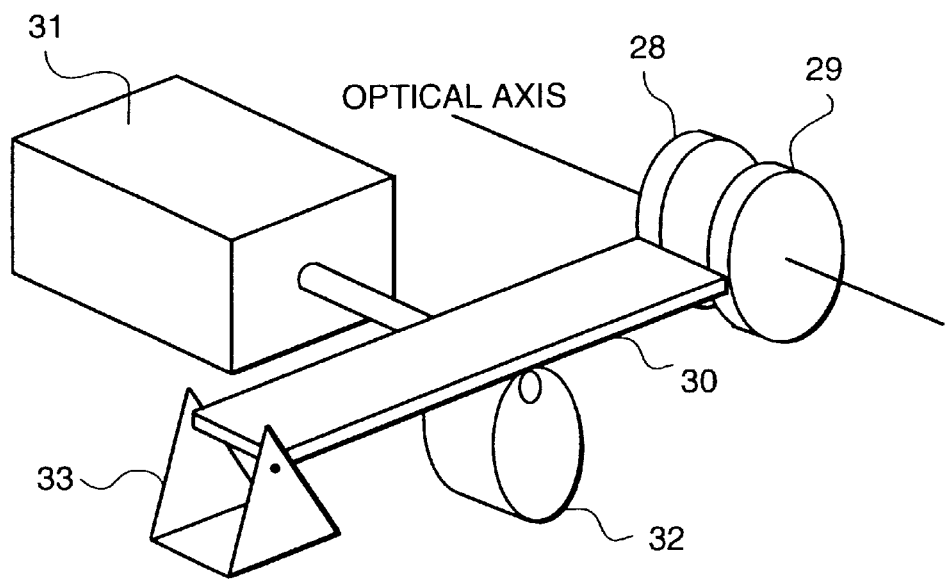
FIG. 17 is a diagram for explaining a lens unit positioning mechanism in accordance with the present invention.

The construction of a first type of driving mechanism is shown in FIG. 17, wherein a lens unit 30 supporting lenses 28 and 29 is rotated around a supporting body 33 operating as a fulcrum by an eccentric cam 32 provided on a rotating shaft of a motor 31, and thus the lenses 28, 29 are moved back and forth to and from the optical axis. The motor 31 is driven by an output signal of the controller 19.

Figure 12:
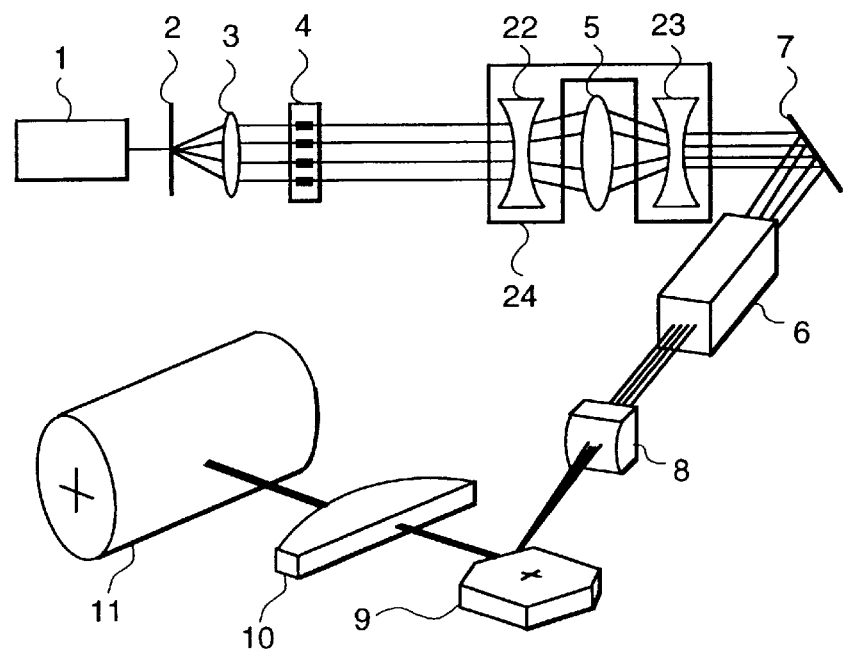
FIG. 12 is a schematic diagram showing the construction of a third embodiment in accordance with the present invention.
Figure 13:
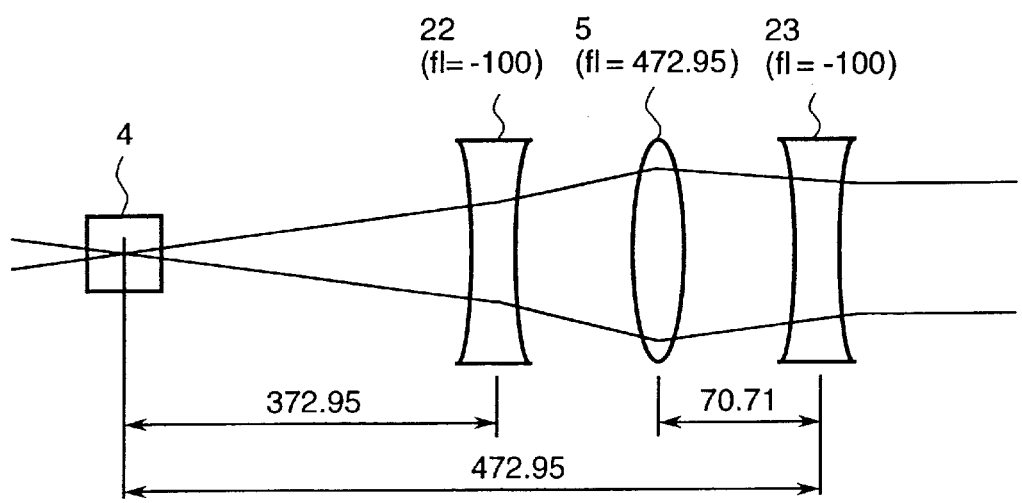
FIG. 13 is a diagram for explaining the lens construction of the third embodiment in accordance with the present invention.
Figure 14:
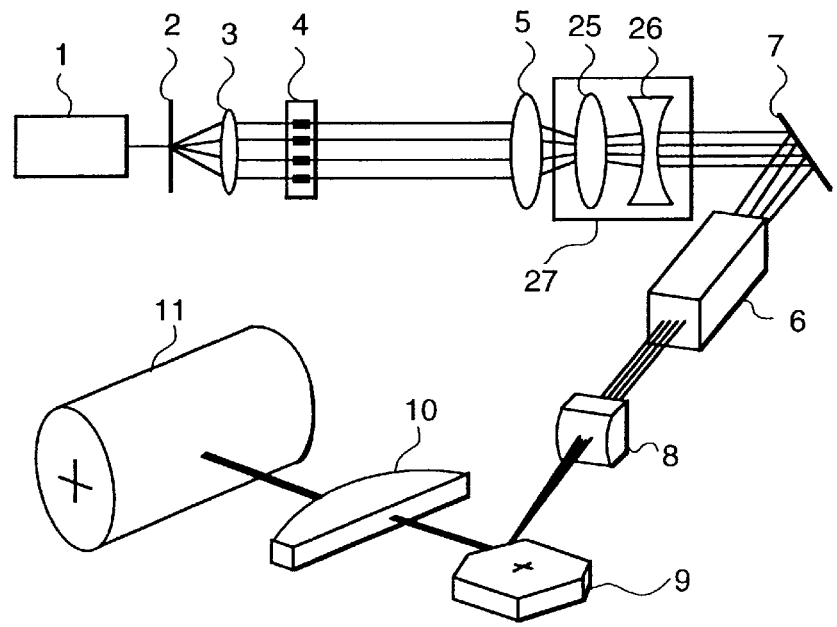
FIG. 14 is a schematic diagram showing the construction of a fourth embodiment in accordance with the present invention.

The lenses 28, 29 correspond to the lenses 12, 13 of FIG. 1 in the first embodiment, correspond to the lenses 22, 23 of FIG. 12 in the third embodiment, and correspond to the lenses 25, 26 of FIG. 14 in the fourth embodiment. The lens unit 30 corresponds to the lens unit 14 of FIG. 1 in the first embodiment, corresponds to the lens 24 of FIG. 12 in the third embodiment, and corresponds to the lens unit 27 of FIG. 14 in the fourth embodiment.

Figure 18:
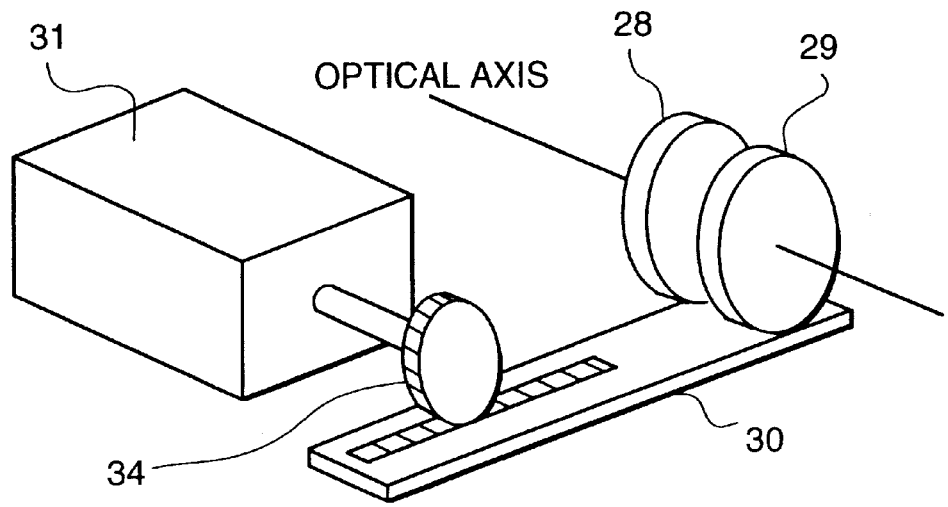
FIG. 18 is a diagram for explaining a lens unit positioning mechanism in accordance with the present invention.

The construction of a second type of drive mechanism is shown in FIG. 18, wherein a gear 34 provided on a rotating shaft of a motor 31 is engaged with a rack provided on a lens unit 30, and the lenses 28, 29 are moved back and forth to and from the optical axis by sliding the lens unit 30.

Figure 19:
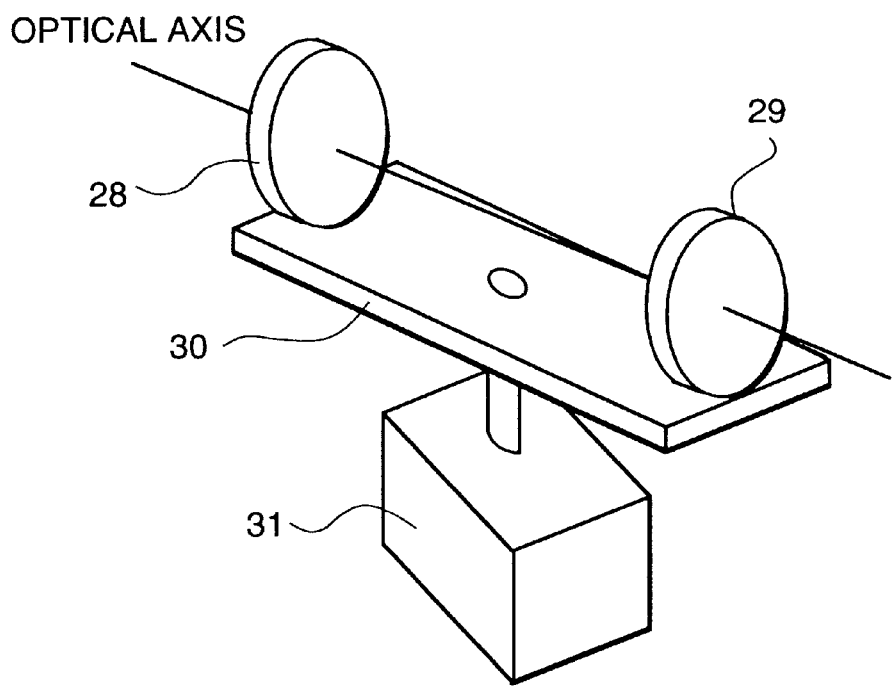
FIG. 19 is a diagram for explaining a lens unit positioning mechanism in accordance with the present invention.

The construction of a third type of drive mechanism is shown in FIG. 19, wherein a lens unit 30 is installed rotatably in the horizonal direction by fixing the lens unit 30 to a rotating shaft of a motor 31. When the lenses 28, 29 are set on the optical axis, the center line of the lenses 28, 29 is fixed in a position where it passes along the optical axis, as shown in FIG. 19. When the lenses 28, 29 are to be removed from the optical axis, the lens unit 30 is rotated, for example, by 90 degrees using the motor 30.

Figure 20:
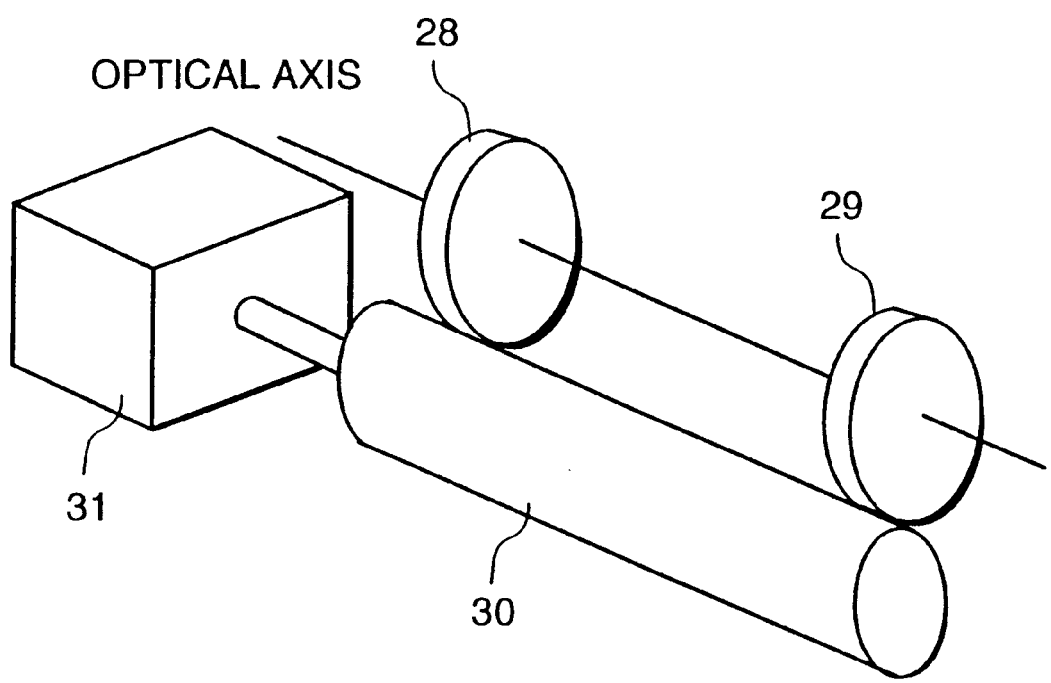
FIG. 20 is a diagram for explaining a lens unit positioning mechanism in accordance with the present invention.

The construction of a fourth type of drive mechanism is shown in FIG. 20, wherein a lens unit 30 is fixed to a rotating shaft of a motor 31. When the lenses 28, 29 are set on the optical axis, the center line of the lenses 28, 29 is fixed at a position where it passes along the optical axis, as shown in FIG. 20. When the lenses 28, 29 are to be removed from the optical axis, the lens unit 30 is rotated using the motor 30 and fixed at a position where the center line of the lenses 28, 29 is offset from the optical axis.

Figure 21:
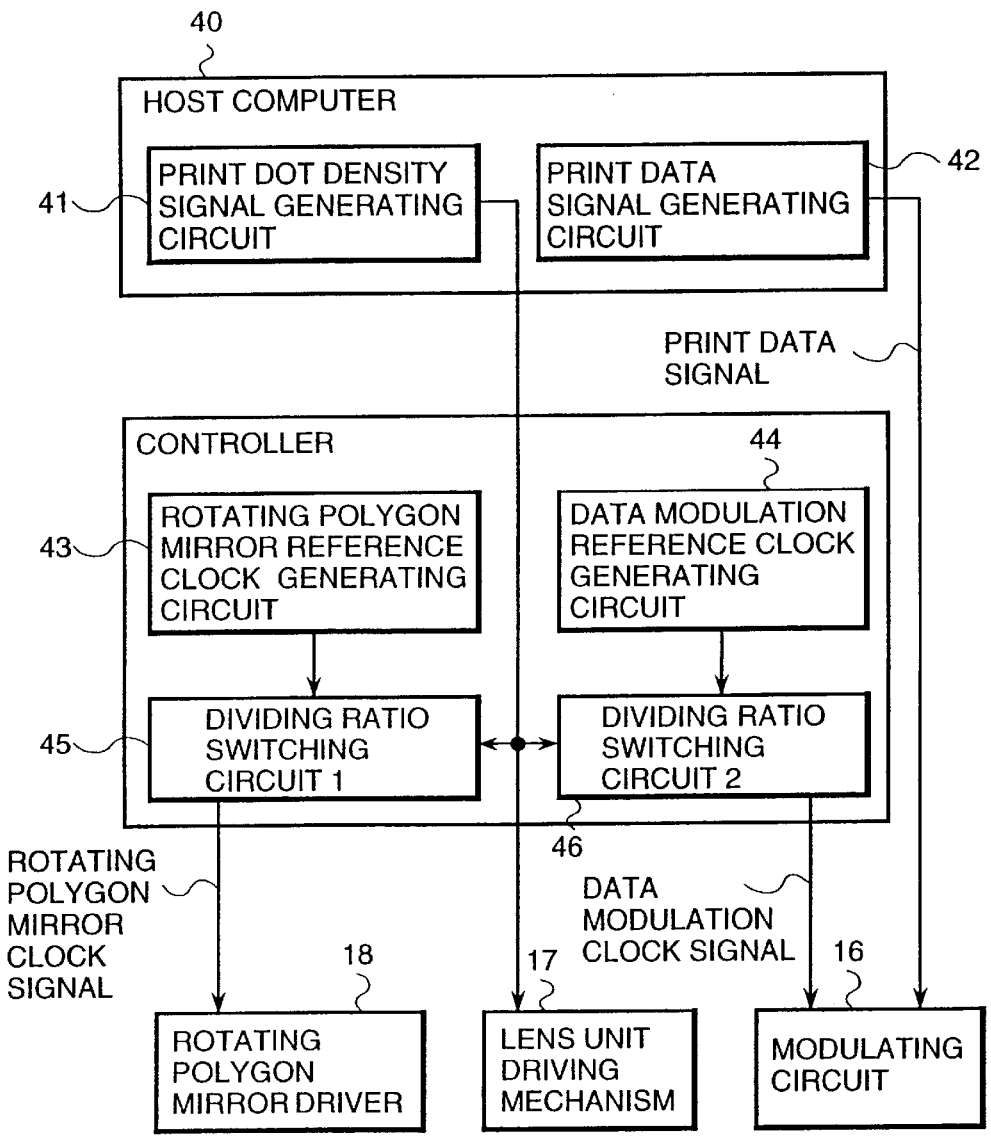
FIG. 21 is a block diagram showing the internal construction of the control unit of the first embodiment in accordance with the present invention.

Description will be made of the internal construction of the controller 19 shown in FIG. 1 in connection with the first embodiment of the present invention, referring to FIG. 21.

A host computer 40 contains a print dot density generating circuit 41 and a print data signal generating circuit 42. The controller 19 contains a rotating polygon mirror reference clock generating circuit 43, a data modulation reference clock generating circuit 44 and dividing ratio switching circuits 45, 46 for dividing the output of the rotating polygon mirror reference clock generating circuit 43 and the output of the data modulation reference clock generating circuit 44, respectively.

A clock signal generated by the rotating polygon mirror reference clock generating circuit 43 is switched according to the dividing ratio corresponding to a print dot density signal using the dividing ratio switching circuit 45 to generate a rotating polygon mirror driving clock signal suitable for the print dot density. The signal is transmitted to the rotating polygon mirror driver 18.

A clock signal generated by the data modulation reference clock generating circuit 44 is switched according to the dividing ratio corresponding to a print dot density signal using the dividing ratio switching circuit 46 to generate a data modulation clock signal suitable for the print dot density. The signal is transmitted to a modulating circuit 16. At the same time, a print data signal from the host computer 40 is also transmitted to the modulation circuit 16. The print dot density signal from the host computer 40 is also transmitted to the lens unit driving mechanism 17.

That is, the controller is characterized by the fact that the dividing ratio is changed in plural steps to generate two or more kinds of rotating polygon mirror driving clock signals and data modulation clock signals.

The same control may be performed by a construction where four or more reference clock generating circuits and four or more dividing circuits are provided in the controller 19, or by a construction where a plurality of controllers capable of generating only one clock signal are provided.

As described above, according to the present invention, it is possible to provide a laser beam scanning apparatus in which the print dot density can be switched using a simple construction. Further, according to the present invention, it is also possible to provide a laser beam scanning apparatus which can accurately change the spot diameter and the beam pitch even when a plurality of light beams are used.

What is claimed is:

1. A method of controlling print density utilizing a laser beam scanning apparatus comprising the steps of:

modulating a plurality of light beams with a modulator having a switchable modulation clock frequency;

deflectively scanning the light beams which have passed through the modulator by a rotating polygon mirror having a switchable rotating speed;

selectively moving at least one movable lens unit having at least one lens for switching a spot diameter of at least one of the plurality of light beams and a beam pitch of the plurality of light beams so that the at least one lens is placed at any one of a position on an optical axis between the modulator and the rotating polygon mirror and a position completely off the optical axis where none of the at least one movable lens unit is on the optical axis; and controlling the print density by switching the modulation clock frequency of the modulator and the rotating speed of the rotating polygon mirror together with the selective movement of the at least one lens of the at least one movable lens unit;

wherein the controll of the print density includes changing the print density to be one of a first print dot density D1 dpi and a second print dot density D2 dpi by switching of the rotating speed of the rotating polygon mirror from a first speed M1 for D1 to a second speed M2[for D2]=M1(D2/D1) for D2 and for switching of the modulating clock frequency of the modulator from a first frequency S1 for D1 to a second frequency S2 [for D2]=S1(D2/D1)$^2$ for D2 together with the selective movement of said at least one movable lens unit so that said at least one lens is completely off [said] the optical axis for D1 and said at least one lens is on the optical axis for D2.

2. A laser beam scanning apparatus providing a controllable print density, comprising:

a modulator for modulating a plurality of light beams and having a switchable modulation clock frequency;

a rotating polygon mirror for deflectively scanning said light beams which have passed through said modulator, said rotating polygon mirror having a switchable rotating speed;

at least one selectively movable lens unit for switching a spot diameter of at least one of the plurality of light beams and a beam pitch of the plurality of light beams, said at least one selectively movable lens unit having at least one lens and being selectively movable with respect to an optical axis so as to place said at least one lens thereof at any one of a position on said optical axis and a position completely off said optical axis where none of said at least one selectively movable lens unit is on said optical axis; and control means for switching the modulating clock frequency of said modulator and the rotating speed of said rotating polygon mirror together with selective movement of said at least one selectively movable lens unit to place said at least one lens of said at least one selectively movable lens unit at any one of the position on said optical axis and the position completely off said optical axis where none of said at least one selectively movable lens unit is on said optical axis so as to control print density;

wherein the control of print density includes changing the print density to be one of a first print dot density D1 dpi and a second print dot density D2 dpi, and wherein for the control of switching from the first print dot density to the second print dot density, said control means changes from a first rotating speed M1 of said rotating polygon mirror for D1 to a second speed $M2=M1(D2/D1)$ for D2 and from a first modulating clock frequency S1 of said modulator for D1 to a second frequency $S2=S1(D2/D1)^2$ for D2 together with the selective movement of said at least one selectively movable lens unit so that said at least one lens is completely off said optical axis for D1 and said at least one lens is on said optical axis for D2.

3. A laser beam scanning apparatus providing a controllable print density, comprising:

a modulator for modulating a plurality of light beams and having a switchable modulation clock frequency;

a rotating polygon mirror for deflectively scanning said light beams which have passed through said modulator, said rotating polygon mirror having a switchable rotating speed;

a lens fixed in position on an optical axis between said modulator and said rotating polygon mirror;

plural lens units for switching both a spot diameter and a beam pitch of the plurality of light beams, each of said plural lens units having at least one lens, one of said plural lens units being arranged at a position between said modulator and said fixed lens and another of said plural lens units being arranged between said fixed lens and said rotating polygon mirror, said one lens unit and said another lens unit being selectively movable with respect to said optical axis so as to place said at least one lens thereof at any one of a position on said optical axis and a position completely off said optical axis where none of said plural lens units is on said optical axis; and control means for switching the modulating clock frequency of said modulator and the rotating speed of said rotating polygon mirror depending upon whether said one lens unit and said another lens unit and said at least one lens thereof are placed at any one of the position on said optical axis and the position completely off said optical axis where none of said plural lens units is on said optical axis so as to control print density;

wherein the control of print density includes changing the print density to be one of a first print dot density D1 dpi and a second print dot density D2 dpi, and wherein for the control of switching from the first print dot density to the second print dot density, said control means changes from a first rotating speed M1 of said rotating polygon mirror for D1 to a second speed $M2=M1(D2/D1)$ for D2 and from a first modulating clock frequency S1 of said modulator for D1 to a second frequency $S2=S1(D2/D1)^2$ for D2 together with the selective movement of said at least one lens unit so that said at least one lens unit is completely off said optical axis for D1 and said at least one lens unit is on said optical axis for D2.

4. A laser beam scanning apparatus providing a controllable print density, comprising:

a modulator for modulating a plurality of light beams and having a switchable modulation clock frequency;

a rotating polygon mirror for deflectively scanning said light beams which have passed through said modulator, said rotating polygon mirror having a switchable rotating speed;

a lens fixed in position on an optical axis between said modulator and said rotating polygon mirror;

a single lens unit for switching both a spot diameter and a beam pitch of the plurality of light beams, said single lens unit having plural lenses including at least one lens arranged between said modulator and said fixed lens and at least one other lens arranged between said fixed lens and said rotating polygon mirror, said single lens unit being selectively movable so as to place said at least one lens and said at least one other lens at any one of the position on said optical axis and a position completely off said optical axis where said single lens unit is off said optical axis; and control means for switching the modulating clock frequency of said modulator and the rotating speed of said rotating polygon mirror together with selective movement of said single lens unit to place said at least one lens and said at least one other lens at any one of the position on said optical axis and the position completely off said optical axis where said single lens unit is off said optical axis so as to control print density;

wherein the control of print density includes changing the print density to be one of a first print dot density D1 dpi and a second print dot density D2 dpi, and wherein for the control of switching from the first print dot density to the second print dot density, said control means changes from a first rotating speed M1 of said rotating polygon mirror for D1 to a second speed $M2=M1(D2/D1)$ for D2 and from a first modulating clock frequency S1 of said modulator for D1 to a second frequency $S2=S1(D2/D1)^2$ for D2 together with the selective movement of said single lens unit so that said single lens unit is completely off said optical axis for D1 and said single lens unit is on said optical axis for D2.

* * * * *